Nov. 18, 1930. W. FORSTNER 1,782,004
MESH CHAIN AND METHOD OF MAKING SAME
Filed May 29, 1929

William Forstner INVENTOR
BY
ATTORNEY

Patented Nov. 18, 1930

1,782,004

UNITED STATES PATENT OFFICE

WILLIAM FORSTNER, OF IRVINGTON, NEW JERSEY, ASSIGNOR TO FORSTNER CHAIN CORPORATION, OF IRVINGTON, NEW JERSEY

MESH CHAIN AND METHOD OF MAKING SAME

Application filed May 29, 1929. Serial No. 366,830.

This invention relates to improvements in ornamented chains and more particularly in the process of making the same.

The chains herein referred to are used in the construction of numerous articles of personal adornment, such as bracelets, watch chains, waist belts, etc., and are ordinarily constructed by weaving a wide web of fine wires of any desired metal, cutting the web lengthwise into ribbons of appropriate width, the cut edges presenting the ends of the wire without protection, and in order to prevent fraying of the edges, contiguous wires are soldered into pairs at their ends, or preferably bead, curb or cable chain ornaments are applied in closely spaced relation.

The links of this ornamental border must be separately soldered, in order to retain flexibility of the fabric, the process being tedious and time-taking and not infrequently results in an uneven selvage of unsightly appearance, corrected by hand filing at a very considerable expense. Such filing is likely to lay bare the base material, if gold or silver filled wire be used, causing tarnishing and rendering the goods unsalable.

It is an object of the instant invention to make such chains from webs woven with at least the weft strands of solder filled wire, whereby any suitable edge ornament may be soldered on in long lengths, each link or separate element of the marginal ornament, such as so-called bead chains, being soldered in a substantially continuous operation instead of link after link as has been the custom heretofore.

A further feature is to provide a process that eliminates the slow and tedious manner of single soldering and which provides an attractive ornamental marginal finish for the ribbon edges.

These important features are attained by the novel process hereinafter described in detail, the steps of which are indicated by the accompanying drawing, forming a material part of this disclosure, and in which:—

Figure 1:
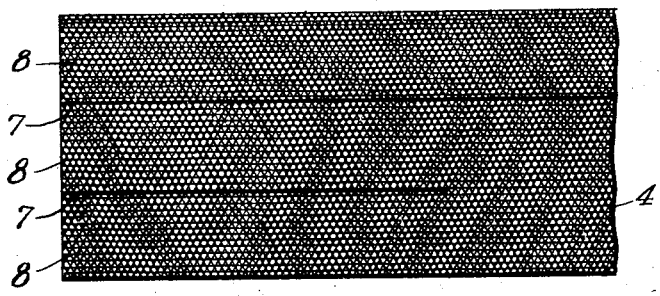
Fig. 1 is a plan view of a short length of woven wire web fabric showing it as partially slit to produce ribbon widths.
Figure 2:
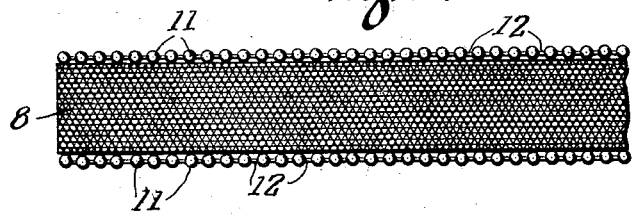
Fig. 2 is a plan view of a completed section of chain having a beaded border as produced by the described process.
Figure 3:
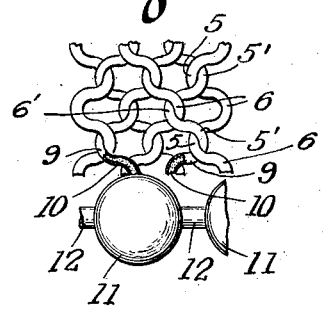
Fig. 3 is a greatly enlarged fragmentary view of a web showing it as being attached to a beaded type of chain ornamentation.

The weaving of the web 4, preferably of the well-known mesh type, is clearly shown in Fig. 3, and may be of any desirable width and length, as indicated in Fig. 1.

Each of the wires is bent to produce a series of oppositely disposed loops 5—6 in which are engaged the loops 5'—6' of the next adjacent wire throughout the fabric, the thickness of which fabric is equivalent to the double thickness of one strand of wire.

The web is slit, as at 7 to produce ribbons 8 of uniform width, which obviously present raw edges at the ends of the wires, requiring fastening and also a suitable finish.

Each wire is in fact a tube 9 formed of any preferred precious or semi-precious metal and having a core or filler 10 of solder suitable for use with the material of the tube.

On the drawing shown a well-known type of bead chain is used, consisting of a series of hollow spheres 11 connected by uniformly spaced links 12 in such manner as to produce a highly flexible chain having a pleasing appearance and smooth to the touch.

The chains are disposed adjacent the edges of the ribbon 8 and passed in close contact together over a suitable heater, causing the solder to melt and run sufficiently to connect each pair of strands, or each alternate pair, as the case may be, with the periphery of the spherical elements 11, causing them to become firmly united by the solder, while the intervening pairs of ends become united by minute globules of solder.

The use of solder-filled mesh wire per se is not claimed as new, as it has long been known in the art, but its application, as an attaching means for an ornamented marginal chain, is believed to be both novel and useful.

From the foregoing it will be seen that a simple device for this purpose has been disclosed in the preferred form of its embodiment, but it is not desired to restrict the details to the exact construction shown, it being obvious that changes, not involving the exercise of invention, may be made without conflicting with the scope of the appended claims.

Having thus described the invention, what is claimed as new and desired to secure by Letters Patent, is:—

1. The method of manufacturing ornamental flexible band chains, which consists in weaving a web of solder-filled wires and uniting to the marginal edges thereof ornamental border chains consisting of a flexible series of hollow spheres connected by uniformly spaced links, and passing the said band chain and border chains when disposed in close proximity together over a zone of heat sufficient to cause the solder to flow from the wires to the links and spheres of the border chains throughout the passage thereof through the heat zone.

2. An ornamental flexible mesh chain comprising a woven body formed of solder-filled wires, and ornamental border chains consisting of a flexible series of hollow spheres connected by uniformly spaced links and united to the edges of the said woven body by the melted solder contained in the said wires.

In testimony whereof I have hereunto affixed my signature.

WILLIAM FORSTNER.